United States Patent [19]

Ringwald

[11] 4,158,250

[45] Jun. 19, 1979

[54] BINDING DEVICE

[76] Inventor: Arthur Ringwald, Box 95, Coeyman's Hollow, N.Y. 12046

[21] Appl. No.: 886,158

[22] Filed: Mar. 13, 1978

[51] Int. Cl.² ............................................. F16L 33/00
[52] U.S. Cl. ................................... 24/16 R; 24/17 B; 24/201 LP; 206/805
[58] Field of Search ............... 24/129 D, 73 A, 17 B, 24/16 R, 17 AP, 201 LP, 30.5 R, 17 R, 17 A; 132/46 R; 206/805; 128/327

[56] References Cited

U.S. PATENT DOCUMENTS

| 410,978 | 9/1889 | Kimball | 24/30.5 R |
| 2,969,070 | 1/1961 | Todfield | 24/17 AP |
| 3,099,271 | 7/1963 | Dubelier | 132/46 R |
| 3,301,266 | 1/1967 | Hoffmann | 132/46 R |
| 3,919,740 | 11/1975 | Scherb | 24/73 A |

FOREIGN PATENT DOCUMENTS

| 610308 | 12/1960 | Canada | 132/46 R |
| 695410 | 8/1940 | Fed. Rep. of Germany | 132/46 R |
| 1450821 | 7/1966 | France | 24/16 R |

Primary Examiner—Bernard A. Gelak
Attorney, Agent, or Firm—Charles J. Brown

[57] ABSTRACT

An elastic binding device for circumferentially containing a bundle. A closed-loop elastic band is stretched around the bundle and through itself with a pin holding the ends of the band.

1 Claim, 2 Drawing Figures

BINDING DEVICE

BACKGROUND OF THE INVENTION

Various forms of binding devices for bundles or packages have been known in the prior art, such as those described in U.S. Pat. Nos. 1,030,661, 1,156,565, 3,081,781 and 3,119,160. In none of these prior art devices, however, is there a suggestion of combining a closed-loop elastic band with a removable pin as provided by this invention.

The combination of the invention permits a bundle to be circumferentially contained by easy manipulation of a stretchable band and an associated pin. The assembly may be detached from the bundle with equal facility, without concern for knots, clasps, hooks or the like, merely by withdrawing the pin from an end loop portion of the elastic band. The binding device of the invention is inexpensive to manufacture and requires an irreducible minimum of parts. It can be used for a wide variety of applications one of which is as means to be carried in a workman's pocket for binding together a folded electrical power tool cord.

Summary of the Invention

The invention provides a binding device for circumferentially containing a bundle, comprising a closed-loop band disposed around the bundle in stretched condition and having first and second end loop portions. The first end loop portion of the band extends through the second end loop portion. A pin is provided which is removably disposed through the first end loop portion to prevent the first end loop portion from withdrawing out of the second end loop portion. By this construction the band remains contracted about and circumferentially contains the bundle. In a preferred form the elastic band is of rubber and the pin is of wooden dowel material.

Other objects and advantages of the invention will become apparent from the following description taken in conjunction with the accompanying drawing.

DESCRIPTION OF PREFERRED EMBODIMENT

Figure 1:
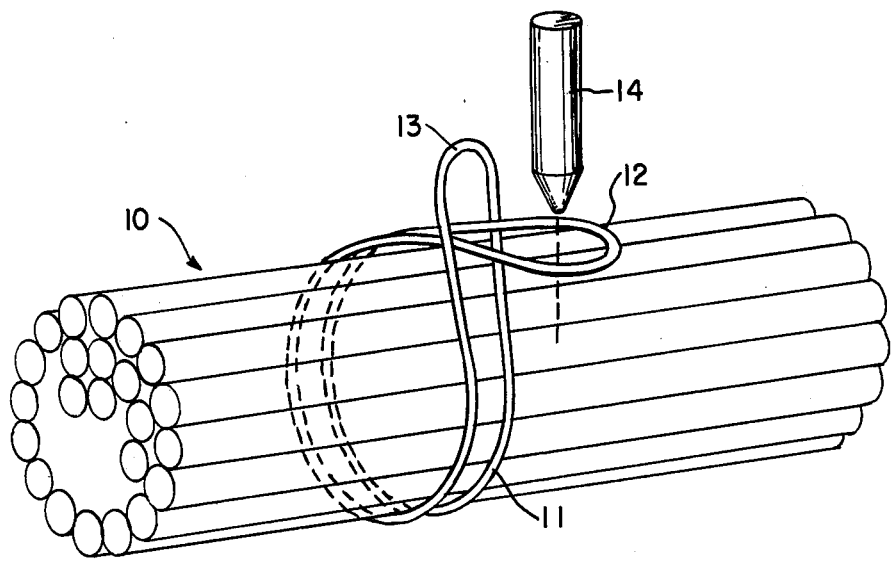
FIG. 1 is a perspective view of the elastic band of the invention disposed about a bundle before insertion of the pin.

A bundle 10 to be circumferentially contained by the binding device of the invention is illustrated in the drawing as a plurality of rods, though it is understood that this is only for purposes of example. A closed-loop band 11 is provided which is of elastic material such as rubber. It is disposed around the bundle as shown in FIG. 1 in stretched condition and therefore its unstretched length is preferably somewhat less than the circumference of the bundle. The band 11 includes a first end loop portion 12 and a second end loop portion 13.

As shown in FIG. 1 the first end loop portion 12 is extended through the second end loop portion 13. A pin 14, preferably of wooden dowel material, is removably disposed through the first end loop portion 12 to prevent that first end loop portion from withdrawing out of the second end loop portion. The pin 14 is formed with a somewhat pointed end as shown in the drawing to facilitate entry into the first end loop portion.

Figure 2:
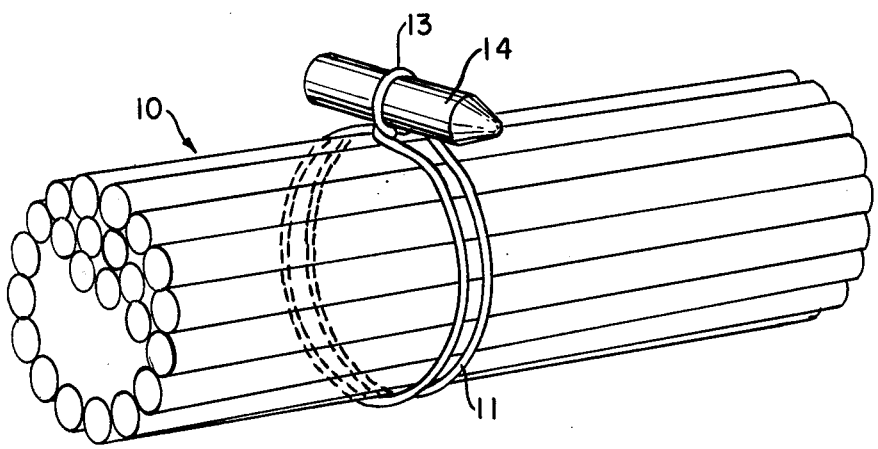
FIG. 2 is a perspective view of the structure of FIG. 1 after the band has been contracted into place.

After being so assembled the stretched band 11 is allowed to contract about the bundle 10 as shown in FIG. 2 so that the second end loop portion 13 tightens about the pin 14 and the closed-loop band is left circumferentially containing the bundle. The assembly may be released simply by withdrawing the pin 14 out from the second end loop portion 13 of the band 11. To maintain the two parts of the assembly in connection with one another the pin 14 may be attached to the band 13 by a separate string.

The scope of the present invention is set forth in the following claims rather than in the foregoing description of the embodiment thereof.

I claim:

1. A binding device for circumferentially containing a bundle comprising:
    (a) a closed-loop elastic band disposed around the bundle in stretched condition and having first and second end loop portions,
    (b) said first end loop portion of said band extending through said second end loop portion,
    (c) said second end loop portion being elastically tightened directly around said first end loop portion, and
    (d) a single pin removably disposed through said first end loop portion to prevent said first end loop portion from withdrawing out of said second end loop portion,
    (e) said pin being of dowell material and having a substantially pointed end,
    (f) whereby said band remains contracted about and circumferentially contains said bundle.

* * * * *